(12) United States Patent
Schumann et al.

(10) Patent No.: US 10,347,873 B2
(45) Date of Patent: Jul. 9, 2019

(54) ARRANGEMENT OF MULTIPLE GALVANIC ELEMENTS STACKED IN A HOUSING, AND BATTERY WHICH INCLUDES SUCH AN ARRANGEMENT OF GALVANIC ELEMENTS

(71) Applicant: Robert Bosch GmbH, Stuttgart (DE)

(72) Inventors: Bernd Schumann, Rutesheim (DE); Ingo Kerkamm, Stuttgart-Rohr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 344 days.

(21) Appl. No.: 15/305,225

(22) PCT Filed: Apr. 7, 2015

(86) PCT No.: PCT/EP2015/057511
§ 371 (c)(1),
(2) Date: Dec. 20, 2016

(87) PCT Pub. No.: WO2015/162001
PCT Pub. Date: Oct. 29, 2015

(65) Prior Publication Data
US 2017/0117509 A1    Apr. 27, 2017

(30) Foreign Application Priority Data
Apr. 23, 2014   (DE) .................. 10 2014 207 610

(51) Int. Cl.
*H01M 2/02* (2006.01)
*H01M 2/10* (2006.01)
(Continued)

(52) U.S. Cl.
CPC ......... *H01M 2/0207* (2013.01); *H01M 2/027* (2013.01); *H01M 2/0237* (2013.01);
(Continued)

(58) Field of Classification Search
CPC ......... H01M 10/0413; H01M 10/0436; H01M 2/0207; H01M 2/0237; H01M 2/027; H01M 2/0277; H01M 2/1022; H01M 2/1077

See application file for complete search history.

(56) References Cited

U.S. PATENT DOCUMENTS

| | | |
|---|---|---|
| 5,254,415 A | 10/1993 | Williams et al. |
| 2003/0054244 A1 | 3/2003 | Fredriksson et al. |
| 2009/0181306 A1 | 7/2009 | Kurisawa |

FOREIGN PATENT DOCUMENTS

| | | |
|---|---|---|
| CN | 101278427 A | 10/2008 |
| DE | 102012212299 | 1/2014 |

(Continued)

OTHER PUBLICATIONS

International Search Report for PCT/EP2015/061225, dated Dec. 17, 2015.

*Primary Examiner* — Carlos Barcena
(74) *Attorney, Agent, or Firm* — Norton Rose Fulbright US LLP; Gerard Messina (57) ABSTRACT

An arrangement includes a housing and multiple galvanic elements stacked in the housing, the galvanic elements having a layer sequence which includes a current collector associated with the anode, an anode, a separator, a cathode, and a current collector associated with the cathode. In each case a seal covers the edge of the layer sequence of a galvanic element in order to electrically insulate and seal same in a gas-tight manner, and the outer surface of the current collector associated with the anode and the outer surface of the current collector associated with the cathode remain at least partly free, so that the current collector, associated with the cathode, of a galvanic element electri- (Continued)

cally contacts the current collector, associated with the anode, of a galvanic element adjacently situated in the housing.

12 Claims, 4 Drawing Sheets

(51) Int. Cl.
*H01M 10/04* (2006.01)
*H01M 2/08* (2006.01)

(52) U.S. Cl.
CPC ....... *H01M 2/0245* (2013.01); *H01M 2/0275* (2013.01); *H01M 2/0277* (2013.01); *H01M 2/0285* (2013.01); *H01M 2/1022* (2013.01); *H01M 2/1072* (2013.01); *H01M 2/1077* (2013.01); *H01M 10/0413* (2013.01); *H01M 10/0436* (2013.01); *H01M 2/08* (2013.01)

(56) References Cited

FOREIGN PATENT DOCUMENTS

| WO | 98/05081 | 2/1998 |
|----|----------|--------|
| WO | 2004/059780 | 7/2004 |

Fig. 8b

ARRANGEMENT OF MULTIPLE GALVANIC ELEMENTS STACKED IN A HOUSING, AND BATTERY WHICH INCLUDES SUCH AN ARRANGEMENT OF GALVANIC ELEMENTS

FIELD OF THE INVENTION

The present invention relates to an arrangement which includes a housing and multiple galvanic elements stacked in the housing, the galvanic elements having a layer sequence which includes a current collector associated with the anode, an anode, a separator, a cathode, and a current collector associated with the cathode. Moreover, the present invention relates to a battery which includes at least one such arrangement.

BACKGROUND INFORMATION

Lithium-ion batteries are characterized, among other things, by a very high specific energy and an extremely low self-discharge.

Lithium-ion cells include at least one positive electrode and at least one negative electrode (cathode and anode, respectively), whereby lithium ions migrate back and forth between the two electrodes during charging or discharging. So-called lithium ion conductors are necessary to allow transport of the lithium ions to take place. In the lithium-ion cells presently used, which are employed, for example, in the consumer sector (mobile telephones, MP3 players, etc.) or as an energy store in electric or hybrid vehicles, the lithium ion conductor is a liquid electrolyte which frequently contains the lithium conducting salt lithium hexafluorophosphate ($LiPF_6$ dissolved in organic solutions. These lithium-ion cells, which include the electrodes, the lithium ion conductor, and current collectors which establish the electrical connections, are enclosed in a package. These packages insulate the battery cells and prevent substances from leaking out of the cell.

One disadvantage of lithium-ion cells containing liquid electrolyte is that with aging and at elevated temperatures, also under thermal stress, the electrolyte component may decompose, resulting in overpressure in the cell. Without appropriate protective measures, this may result in rupture or even combustion of the cells.

Alternatively, it is possible to use a solid ceramic or inorganic lithium ion conductor instead of a liquid electrolyte. As a result of this design, leakage of the electrolyte in the event of damage to the housing is avoided. In addition, it is no longer possible for chemical decomposition to take place when there is a pressure buildup. However, a housing cannot be dispensed with, since the cells must be electrically insulated from one another, and leakage of the active materials of the electrodes must be prevented. This is also the case when multiple battery cells are combined into a single battery housing, since otherwise, internal short circuits may occur between the cells. It is problematic that on the one hand the cells must be correctly connected to one another, for example in a series connection, in order to generate higher voltages, and on the other hand, that the volume of the individual battery cells may change, depending on the state of charge of the battery cell. In addition, it is desirable for the packages of the individual battery cells to take up what may belittle space, since the space required by the cell packages merely enlarges the battery without contributing to the capacity of the battery.

The package is particularly important for battery cells which include corrosive, easily soluble, or volatile components, for example in the area of the cathode, which must not be allowed to penetrate into the area of the anode or also escape from the battery cell. Examples of such include sulfur or polysulfides of a lithium-sulfur battery cell, a sodium-sulfur battery cell, or some other metal sulfide battery cell. Another example is metal fluorides such as iron fluorides ($FeF_3$, $FeF_2$), copper fluorides, or other metal fluorides in a lithium-metal fluoride cell. If the sulfides or fluorides in these examples were to escape from the area of the cathode, this could result in interfering reactions with materials of the anode or other cell components.

The package is likewise particularly problematic from a mechanical standpoint in conjunction with the use of solid materials as electrolyte, separator, and/or ion conductor, since a seal at the solid surfaces or edges reacts sensitively to changes in volume.

SUMMARY OF THE INVENTION

An arrangement is provided which includes a housing and multiple galvanic elements stacked in the housing, the galvanic elements having a layer sequence which includes a current collector associated with an anode, an anode, a separator, a cathode, and a current collector associated with the cathode, in each case a seal covering the edge of the layer sequence of a galvanic element in order to electrically insulate and seal same in a gas-tight manner, and the outer surface of the current collector associated with the anode and the outer surface of the current collector associated with the cathode remaining at least partly free, so that the current collector, associated with the cathode, of a galvanic element electrically contacts the current collector, associated with the anode, of a galvanic element adjacently situated in the housing. A series connection of the galvanic elements may be established in this way.

The housing in which the individual galvanic elements are accommodated may be a battery housing or a cell modular housing, for example. The housing may have a prismatic or approximately cylindrical design with a circular or rectangular cross section, for example. The individual galvanic elements are accommodated in a stacked arrangement in the housing, "stacked" meaning that the individual galvanic elements are adjacently situated in the shared housing and optionally pressed together in the stacking direction. The individual galvanic elements have a cross section which corresponds to the housing or to a frame situated in the interior of the housing, and may thus have a circular, rectangular, or strip-shaped design, for example.

Each galvanic element includes a layer sequence with an anode arrangement which includes a current collector associated with the anode, and an anode, a separator, and a cathode arrangement which likewise includes a current collector associated with the cathode, and a cathode. The separator is configured as an ion-conducting separator, so that on the one hand it electrically insulates the anode arrangement and the cathode arrangement, but on the other hand allows an ion current between the two electrodes. If the galvanic element is configured as a lithium-ion cell, for example, the anode includes metallic lithium, for example, and the cathode includes, for example, an active material which is selected, for example, from a lithiated transition metal oxide, a metal sulfide, or a metal fluoride, or some other substance that forms a chemical compound with lithium. The separator is then correspondingly configured as a lithium ion conductor, and is made, for example, of a ceramic material such as lithium garnet, LISICON, or a sulfidic glass, or a crystalline ion-conducting compound containing the elements phosphorus and sulfur, and an additive such as germanium or silicon, or some other element as dopant. When the galvanic element is charged, lithium ions flow from the cathode to the anode and accumulate there in the form of metallic lithium, or also an alloy of lithium with silicon, for example. Conversely, during discharging, lithium ions are released from the anode, migrate through the separator, and accumulate once again in the active material of the cathode, or undergo a direct reversible reaction with the active material of the cathode, for example sulfur, a metal sulfide such as $FeS_2$, or a metal fluoride. During this process the volume of the cathode changes only slightly, whereas the change in volume of the anode is comparatively large. The change in volume of the galvanic element due to the change in volume of the anode or of the cathode may be 100% or greater, depending on the specific embodiment.

The layer sequence of the galvanic element ends on one side of the stack with the current collector associated with the anode, and on the opposite side of the stack ends with the current collector associated with the cathode. The current collectors are generally configured as metal foils; as materials, in the case of lithium-ion cells, copper is generally used for the current collector associated with the anode, and, for example, nickel, aluminum, titanium, niobium, tantalum, gold, or also carbon or a laminate or layer system made of these components is generally used for the current collector associated with the cathode. The metal foils used are themselves gas-tight, and prevent the electrode material from escaping through the current collector. A seal for the galvanic element is therefore necessary only at the edges of the layer sequence.

The seal provided in the arrangement, which covers the edge of the layer sequence of a galvanic element, is configured in such a way that the edge is electrically insulated and closed off in a gas-tight manner. Thus, electrode material contained in the galvanic element also cannot escape from the layer sequence at the edges. The electrical insulation of the edge due to the seal also prevents a direct electrical connection of the current collector associated with the cathode with the current collector of the same galvanic element associated with the anode, so that a short circuit within the galvanic element due to direct contact of the two current collectors at the edge of the layer sequence is not possible.

The seal covers essentially only the edge of the layer sequence, so that the outer surface of the current collector associated with the anode and the outer surface of the current collector associated with the cathode remain at least partially free. In this way it is easily possible to connect multiple galvanic elements in series by simply stacking them in the housing. The electrical connection of the galvanic elements with one another is established in that in each case the current collector, associated with the cathode, of a galvanic element contacts the current collector, associated with the anode, of a galvanic element adjacently situated in the housing.

In further specific embodiments of the present invention, it is conceivable to improve the electrical connection between two adjacently situated galvanic elements by soldering, welding, or by joining via a conductive adhesive.

In one specific embodiment of the present invention, the seal of the galvanic elements is formed in such a way that the galvanic elements within a housing contact the wall only with their seal, and are held in a defined position via the seal. The housing and the seal are configured in such a way that a movement of a galvanic element relative to the housing in the stacking direction is possible when the galvanic element expands or contracts.

The provided seal encloses the entire edge of the galvanic elements. If the galvanic elements have been joined together to form the arrangement, they contact the housing only at the sealed edge. The areas of the galvanic elements not covered by the seal are utilized together for electrically contacting the galvanic elements. The seals of the galvanic elements are not fixedly connected to the housing when they are inserted therein, so that they are movable in the housing in the stacking direction. It is conceivable to introduce a sliding element in the form of a thin strip between the housing and the seal in order to make it easier for the seal and thus the galvanic elements to move relative to the housing. This is advantageous in particular for arrangements which include a large number of galvanic elements, for example more than 10, or more than 30, or in general more than 100, since in that case a significant change in size of the overall stack may result from a change in size of even a few 10 µm per galvanic element.

Within a galvanic element, the greatest changes in volume occur during a charge/discharge cycle within the electrodes. In one specific embodiment of the present invention, it is therefore provided that on its inner side facing a galvanic element, the seal has a space which is configured for compensating for a material expansion of at least one of the electrodes of a galvanic element.

If the electrode then expands, for example during charging or discharging of the galvanic element, in particular by displacing a liquid component or a gel, for example, by metal deposition, for example, the additional volume of the space formed in the seal may be accommodated, and no external deformation of the galvanic element occurs.

In one specific embodiment of the present invention, at least one portion of the seal has an elastic design in order to compensate for an expansion of a galvanic element.

This is advantageous in particular when the galvanic element is to expand also in its edge area. A large force would act on the seal due to the expansion, and could damage the seal. If the seal has an elastic design, it may follow the expansion of the galvanic element without being damaged.

It is conceivable to design a portion of the seal as an elastomer, or to design a portion of the seal as a spring element.

In another specific embodiment of the present invention, the seals of the galvanic elements include connecting elements in order to connect the seal of one galvanic element to the seal of another galvanic element situated in the housing.

Since the individual galvanic elements are electrically connected to one another due to contact of their mutually facing current collectors, it is advantageous for the exact orientation of the individual galvanic elements with respect to one another to be fixedly predefinable. If a seal of one galvanic element has protrusions on one side, and an adjoining galvanic element has corresponding depressions on its opposite side of the seal, the protrusions and depressions may engage with one another and establish a form fit. Unintentional shifting of the galvanic elements thus connected to one another is then effectively prevented.

In one variant of the present invention, it is conceivable for appropriate connecting elements to be situated at the seals of each galvanic element. In further variants of the arrangement according to the present invention, the provided connecting elements may also be situated only at every fifth galvanic element, for example. In this way, the level of effort for providing the connecting elements and for the required stability of the arrangement may be balanced against one another.

In one specific embodiment of the arrangement, the seal includes a sealing element having a ridge that is directed inwardly. The ridge is also configured to at least partially transmit force, which acts on the sealing element in the stacking direction, to the separator in the direction of one of the current collectors.

In this specific embodiment of the present invention, the seal includes a sealing element with a ridge, the ridge being directed inwardly and engages with the stacked structure of a galvanic element. In the stack sequence, the ridge is situated between the separator and one of the two current collectors, for example the current collector associated with the cathode. If multiple galvanic elements are now stacked, and a force is exerted on this stack by pressing, for example, this force is also transmitted via the ridge to the edges of the individual layers in the layer sequence of a galvanic element. For example, starting from the ridge, a pressing force then acts initially on the separator, which is pressed against the current collector associated with the anode. This current collector associated with the anode is in turn pressed against a current collector associated with the cathode of the adjacent galvanic element, so that this current collector associated with the cathode is pressed against the ridge situated between the current collector associated with the cathode, and the separator of this adjacent galvanic element.

Pressing forces thus act on the edge areas of the current collectors or of the separator of a galvanic element, and effectuate a good seal and prevent an escape of the anode material accommodated between the current collector associated with the anode, and the separator, and similarly, prevent an escape of the cathode material accommodated between the separator and the current collector associated with the cathode.

In one specific embodiment of the arrangement according to the present invention, the separator protrudes beyond the surfaces of the electrodes and the current collectors, an insulating polymer layer is situated at the edges of the current collectors, and the seal includes at least one sealing element which is situated and configured in such a way that the separator is pressed against one of the current collectors in a sealing manner.

In contrast to the variant described above, the sealing element does not have to cover the edge via the ridge, but instead is situated between the separator and one of the current collectors. Since the current collectors have a smaller surface area and are enclosed by an insulating polymer layer at the edges, the current collectors do not cover, or do not completely cover, the sealing element with their conductive area, but, rather, completely or partially cover the sealing element with the polymer layer situated at their edges.

Similarly as for the specific embodiment described above, material is prevented from escaping from the anode or from the cathode in that forces which act in the stacking direction press, for example, the current collector associated with the anode against the sealing element, and the sealing element in turn presses against the separator, which in turn is pressed against the second current collector associated with the cathode.

Since the current collectors have a smaller surface area and are provided with an insulating polymer layer at their edges, the galvanic element is electrically insulated at the edge in this arrangement as well.

In one embodiment variant, the seal for each galvanic element includes two sealing elements, the thickness of one sealing element corresponding to the thickness of the anode, and the thickness of the other sealing element corresponding to the thickness of the cathode, and a sealing element being situated in the edge area, in each case between the separator and the current collector associated with the particular electrode. In addition, it is advantageously provided that the separator protrudes beyond the surfaces of the electrodes and the current collectors, and an insulating polymer layer is situated at the edges of the current collectors.

As described in the preceding embodiment variant, the forces which act on the galvanic element in the stacking direction are utilized to seal off the galvanic elements at their edges. In the process, for example the current collector associated with the anode is pressed against the sealing element, whose thickness corresponds to the thickness of the anode, this sealing element in turn is pressed against the separator, the separator is pressed against the sealing element, whose thickness corresponds to that of the cathode, and this sealing element in turn is pressed against the second current collector, which is associated with the cathode.

In one specific embodiment of the present invention, the edge of the layer sequence of a galvanic element is coated with an insulating polymer or with an adhesive.

This coating may be used in the arrangement in addition or as an alternative to the sealing elements described above.

When sealing elements within the layer sequence of a galvanic element are used at the edge, it is likewise conceivable to glue sealing elements to the particular layers which adjoin the sealing element. The sealing effect resulting from the pure pressing force may be further improved in this way.

In the arrangement, large forces may act on the stacked galvanic elements, for example due to material expansion within the galvanic elements or due to a pressing force which acts from the outside. It is advantageous when the individual galvanic elements, viewed over their entire surface area, do not deform nonuniformly. Therefore, in one specific embodiment of the arrangement according to the present invention it is provided that support structures are formed within a galvanic element which are configured for absorbing forces which act on the galvanic element in the stacking direction.

In one specific embodiment of the arrangement, the support structures are configured as elevations in the current collectors, an electrically insulating material being situated on the elevations.

When the current collectors are configured as metal foils, for example, the elevations in the current collectors may be created by embossments in the metal foils. The insulation of the elevations ensures that the structure of the elevations does not change due to material deposits during a charge/discharge cycle. One example is a possible deposition of metallic lithium from the anode during charging.

Due to the elevations in the current collectors, the electrodes associated with the particular current collector are mechanically supported, but at the same time the elevations also act as barriers within the electrode. An exchange of electrolyte within the plane of the electrode is no longer unrestrictedly possible. This could result in the current flow being nonuniformly distributed over the surface of the electrode, and thus, the galvanic element being nonuniformly charged or discharged. Therefore, in one variant of the present invention it is provided that the elevations have interruptions in the current collectors which allow an electrolyte flow within the electrode.

In one variant of the present invention, the elevations in the current collector associated with the anode are situated exactly opposite from corresponding elevations in the current collector associated with the cathode. In further specific embodiments, a targeted lateral offset of the elevations may be provided.

The elevations may be situated in the current collectors in various ways, so that the elevations form circles, rectangles, hexagons, or other geometric shapes, for example. In further specific embodiments, it is conceivable for a targeted lateral offset to be provided between the elevations in one current collector and the corresponding elevations on the oppositely situated current collector.

Connecting elements may be situated in the current collectors and in the separator in order to be able to align in a targeted manner the two current collectors with the elevations provided therein. These connecting elements are configured, for example, as depressions in the current collectors and elevations in the separator, in each case a depression in the current collector establishing a form fit with the elevation in the separator, thus precisely defining the lateral alignment of the layers with one another. Likewise (not graphically depicted), the insulated elevations may be provided as an inserted net or as a lattice-like separate structure of the type just described; the tunnel-like leadthroughs for electrolytes may be configured as net elements with a smaller thickness in places. The net elements may be inserted between the electrodes (in particular the anode) and the separators.

A further aspect of the present invention is to provide a battery which includes at least one arrangement as described above.

DETAILED DESCRIPTION

In the following description of the exemplary embodiments of the present invention, identical or similar components and elements are denoted by the same reference numerals, and a repeated description of these components or elements is dispensed with in individual cases. The figures illustrate the subject matter of the present invention only in a schematic fashion.

Figure 1A:
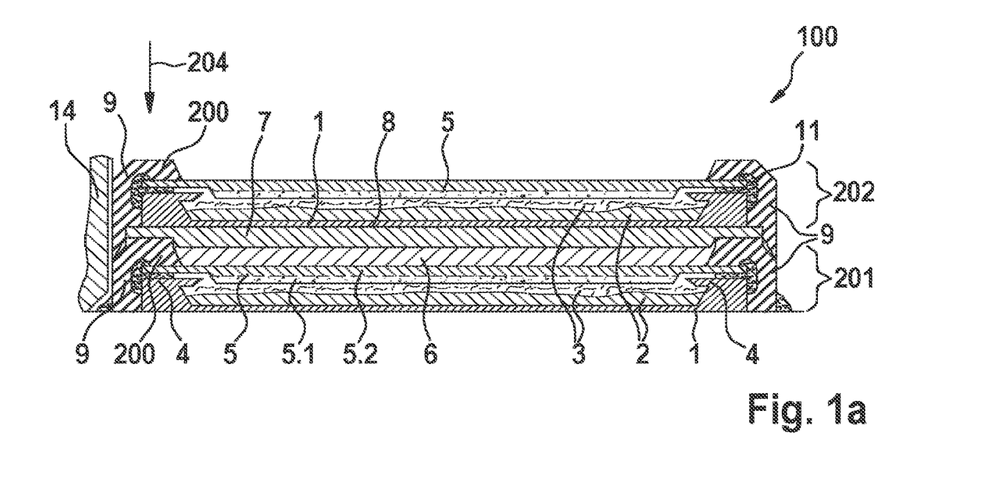
FIG. 1a shows a sectional illustration of a first specific embodiment of the arrangement according to the present invention.

FIG. 1a shows a sectional illustration of a first specific embodiment of an arrangement 100 according to the present invention. Arrangement 100 includes multiple galvanic elements, a first galvanic element 201 being completely illustrated and a second galvanic element 202 being partially illustrated. Galvanic elements 201, 202 are situated in a housing 14, whose wall is merely indicated in FIG. 1a.

Galvanic elements 201, 202 include a current collector 1 associated with the anode, an anode 2, a separator 5, a cathode 6, and a current collector 7 associated with cathode 6.

Sealing elements 9 are situated at the edges of galvanic elements 201, 202. In the first specific embodiment illustrated in FIG. 1a, sealing elements 9 in each case have a ridge 200 which is directed inwardly and engages with the layer sequence of galvanic elements 201, 202. In the embodiment variant illustrated in FIG. 1a, ridge 200 engages between current collector 7 associated with cathode 6, and separator 5. On the side opposite from ridge 200, current collector 1 associated with the anode has an elevation with a circumferential edge 4. This edge 4 is configured for absorbing force which is transmitted via ridge 200 to separator 5, and which thus presses separator 5 against current collector 1 associated with the anode. When a force acts on sealing elements 9 in stacking direction 204, separator 5 is thus pressed in a sealing manner via ridge 200 against current collector 1 associated with the anode, thus reliably closing off anode 2 at the edges so that no material may escape. The force which acts on the sealing element is dimensioned in such a way that the current collector of the cathode of one cell may contact the current collector of the anode of the second cell, directly or via an inserted conductive medium; i.e., the sealing yields enough so that contact of the current collectors from cell to cell is possible.

As is likewise apparent from FIG. 1a, current collector 7 associated with the cathode of first galvanic element 201 is accommodated at its edges between sealing element 9 of first galvanic element 201 and sealing element 9 of adjoining second galvanic element 202. When a force acts on sealing elements 9 in stacking direction 204, current collector 7 associated with the cathode is pressed firmly against sealing element 9, and thus reliably closes off cathode 6 at the edge so that no material may escape.

In variants of arrangement 100, galvanic elements 201, 202 may include an ion-conducting gel layer 3 which is situated between anode 2 and separator 5. The contact between a metallic anode 2 and separator 5 is improved by gel layer 3.

In one variant of arrangement 100, with the aid of a conductive adhesive 8 it is likewise possible to improve the electrical contact between first galvanic element 201 and second galvanic element 202, which results from pressing current collector 7, associated with the cathode, of first galvanic element 201 together with current collector 1, associated with the anode, of second galvanic element 202. In further variants, a weld or solder connection may be provided instead of adhesive 8.

In further specific embodiments of the present invention, separator 5 may have a two-layer design which includes a porous layer 5.1, via which the ion conduction between separator 5 and anode 2 may be established. An additional layer 5.2, which has a closed design, ensures a reliable separation between the anode and the cathode.

In addition, as illustrated for the specific embodiment in FIG. 1a, in addition to the seal, it is possible due to the contact pressure to improve the seal between separator 5 and first current collector 1 associated with the anode, using an adhesive layer 11 that is situated between sealing element 9 and separator 5 and current collector 1 associated with the anode. In another variant, adhesive layer 11 may also be provided between sealing element 9 and current collector 7 associated with the cathode. An epoxy resin, a polyacrylate, or a polyisocyanate, for example, is suitable as adhesive for adhesive layer 11.

Sealing elements 9 have a smooth design on their outer side, and follow the contour of the wall of housing 14. In this way, galvanic elements 201, 202 are securely positioned within housing 14, and at the same time, a movement of galvanic elements 201, 202 relative to housing 14 remains possible in one direction.

Figure 1B:
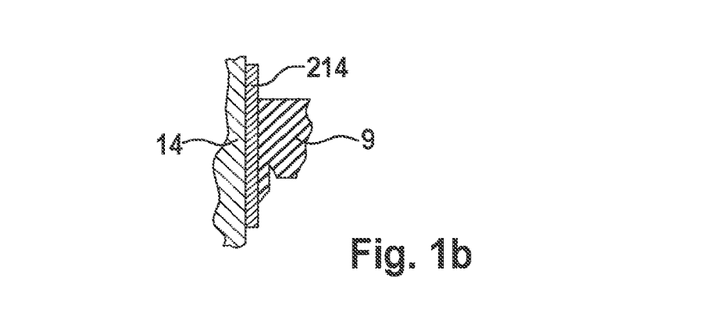
FIG. 1b shows a strip accommodated between the housing and the seal.

FIG. 1b shows a detail of a sealing element 9 which rests against the wall of a housing 14. Sealing element 9 is, for example, part of arrangement 100 described with reference to FIG. 1a, and allows a movement of a galvanic element 201, 202 relative to housing 14. A sliding element 214 is provided between sealing element 9 and the wall to allow sealing element 9 to slide more easily along the wall of housing 14. Sliding element 214 may be configured, for example, as a strip which lines the wall of housing 14 or which is wound around galvanic elements 201, 202.

Figure 1C:
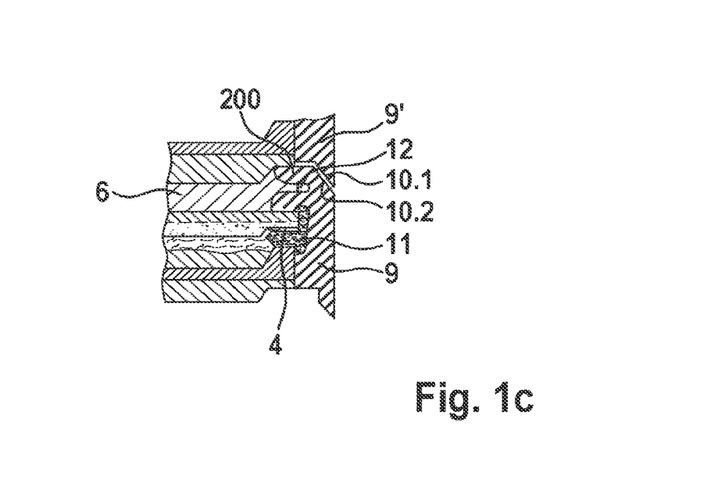
FIG. 1c shows a variant of the first specific embodiment of the arrangement.

FIG. 1c shows a variant of the first specific embodiment of arrangement 100. In contrast to the specific embodiment described with reference to FIG. 1a, ridge 200 has a two-part design, so that a space 12 is formed between the two parts of ridge 200. Space 12 provides room for accommodating material of cathode 6 in the event that it expands within the scope of a charge/discharge cycle.

It is also apparent from the illustration in FIG. 1c that, to improve the alignment of first galvanic element 201 with second galvanic element 202, sealing element 9' may be provided with a bevel 10.1 which points in the direction of anode 2 and tapers outwardly, and which cooperates with a corresponding bevel 10.2 on adjacent sealing element 9. Bevel 10.2 on adjacent sealing element 9 points in the direction of cathode 6 and tapers inwardly. Self-centering occurs during stacking of galvanic elements 201, 202 on account of the selected shape of bevels 10.1 and 10.2.

Figure 2A:
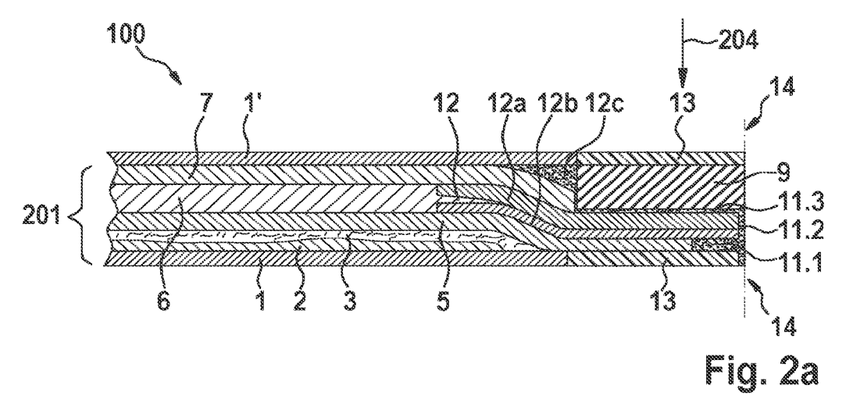
FIG. 2a shows a sectional illustration of a second specific embodiment of the arrangement according to the present invention.

FIG. 2a illustrates a second specific embodiment of arrangement 100. Galvanic element 201 once again includes a current collector 1 associated with the anode, an anode 2, a gel layer 3, a separator 5, a cathode 6, and a current collector 7 associated with cathode 6. To create space 12 which may accommodate the material of cathode 6 in the event of an expansion of cathode 6, two foils 12a and 12b are situated in the edge area between separator 5 and current collector 7 associated with cathode 6. Space 12 is formed between the two foils 12a and 12b. The two current collectors 1, 7 as well as anode 2 and cathode 6 have a smaller surface area than separator 5, so that separator 5 protrudes beyond the edge of these parts. In order to obtain the same surface area as that of separator 5, a polymer layer 13 is situated at the edge of current collector 1 associated with the anode. In contrast, for current collector 7 associated with the cathode, a sealing element 9, not a polymer layer, is provided. When a force acts on the edge area in stacking direction 204, sealing element 9 presses foils 12a and 12b against separator 5, thereby sealing off cathode 6 with respect to the edge.

In addition, due to the force effect, separator 5 is pressed against current collector 1 associated with anode 2 and against polymer layer 13, so that anode 2 is also sealed off with respect to the edge. Polyurethane, for example, is suited as material for polymer layer 13.

The sealing effect achieved by the contact pressure may be further intensified by providing adhesive layers 11.1 between polymer layer 13 and foil 12b, an adhesive layer 11.3 between foil 12a and sealing element 9, and an adhesive layer 11.2 which, starting from sealing element 9 and extending to polymer layer 13, covers the edge of galvanic element 201.

The illustration in FIG. 2a also shows current collector 1' associated with the anode of adjacently situated second galvanic element 202, and polymer layer 13 of current collector 1'. Due to the compression, an additional space 12c is formed between this current collector 1' of second galvanic element 202 and current collector 7, associated with the cathode, of galvanic element 201; this additional space may likewise compensate for an expansion of cathode 6 during deformation of foil 12a and current collector 7 associated with the cathode.

Figure 2B:
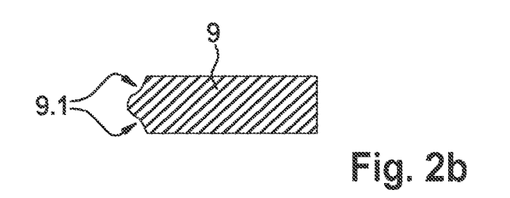
FIG. 2b shows a variant of the sealing element of the second specific embodiment.

FIG. 2b shows a variant of sealing element 9 of the second specific embodiment of arrangement 100. Inwardly directed edges 9.1 of sealing element 9 are rounded in order to avoid damage to current collector 7 associated with the cathode.

Figure 3:
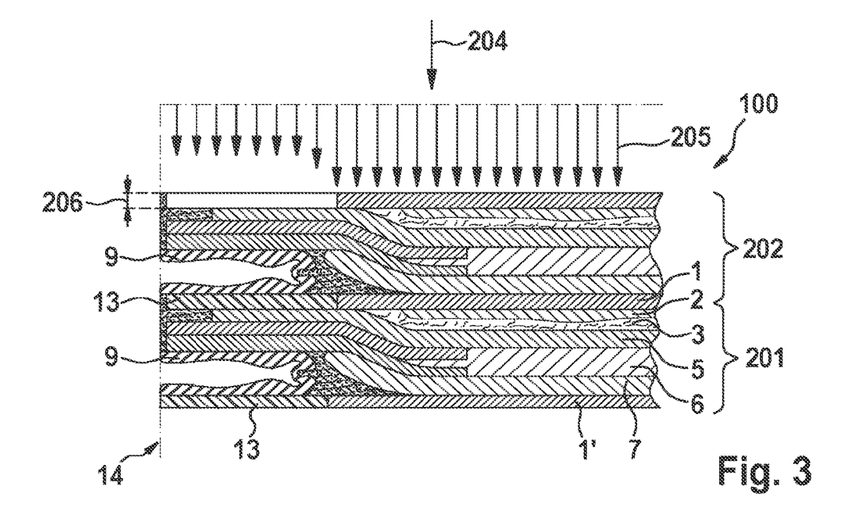
FIG. 3 shows a sectional illustration of a third specific embodiment of the arrangement according to the present invention.

FIG. 3 schematically illustrates a third specific embodiment of arrangement 100 according to the present invention. The third specific embodiment essentially corresponds to the second specific embodiment, except that sealing element 9 has a U shape in the third specific embodiment. The U-shaped folded design allows sealing element 9 to compensate for a change in thickness without a large force effect. In the illustration in FIG. 3, this is depicted by force vectors 205 for a force acting in stacking direction 204. The length of force vectors 205 indicates the magnitude of the force that is necessary to compress the arrangement illustrated in FIG. 3 by distance 206. It is immediately apparent that a smaller force is required in the edge areas, in which sealing elements 9 are situated, than in the remaining areas.

On the other hand, the U-shaped design of sealing element 9 allows a change in volume of galvanic elements 201, 202 caused, for example, by a change in the state of charge, to be elastically followed without causing damage. The U-shaped fold of sealing element 9 hereby acts as an elastic spring element.

Figure 4:
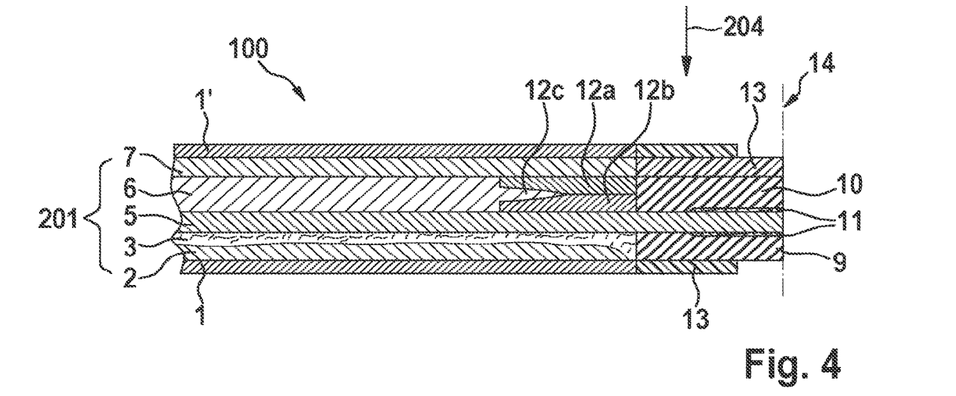
FIG. 4 shows a sectional illustration of a fourth specific embodiment of the arrangement according to the present invention.

FIG. 4 shows a fourth specific embodiment of arrangement 100 according to the present invention. A galvanic element 201 is once again illustrated which includes a current collector 1 associated with the anode, an anode 2, a gel layer 3, a separator 5, a cathode 6, and a current collector 7 associated with the cathode. In addition, current collector 1' of a second galvanic element, associated with the anode, is indicated.

The two current collectors 1, 7 as well as electrodes 2, 6 have a smaller surface area than separator 5, so that the latter protrudes beyond electrodes 2, 6 and current collectors 1, 7. At the edges of current collectors 1, 7, in each case a polymer layer 13 is situated toward the edge, so that the two current collectors 1, 7 are insulated with respect to the edge, i.e., in the direction of the wall of housing 14.

In the specific embodiment illustrated in FIG. 4, a seal which includes two sealing elements 9, 10 is provided for each galvanic element 201. The thickness of first sealing element 9 is selected in such a way that the thickness corresponds to anode 2, and, since in this specific embodiment a gel layer is additionally provided, the thickness corresponds to the combined thickness of anode 2 and gel layer 3.

The thickness of second sealing element 10 corresponds to the thickness of cathode 6. First sealing element 9 is situated between separator 5 and current collector 1 associated with the anode. In the specific embodiment illustrated in FIG. 4, the surface area of current collector 1 associated with the anode is so small that only polymer layer 13, associated with current collector 1 associated with anode 2, covers first sealing element 9.

Second sealing element 10 is in turn situated between separator 5 and current collector 7 associated with cathode 6, here as well the surface area of current collector 7 being so small that only polymer layer 13, associated with current collector 7 associated with cathode 6, overlaps with second sealing element 10. When a force acts in stacking direction 204, the two electrodes 2 and 6 are each sealed off with respect to the edge by the two sealing elements 9 and 10. This seal may be further improved, for example, by providing an adhesive layer 11 in each case between sealing elements 9 and 10 and separator 5. In further embodiment variants, it is conceivable for an adhesive layer to likewise be situated between sealing elements 9 and 10 and the particular polymer layer 13.

Figure 5:
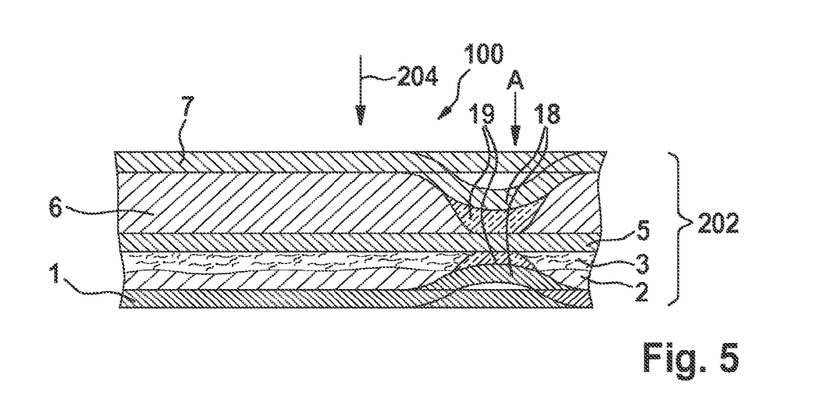
FIG. 5 shows support structures formed within a galvanic element.

FIG. 5 illustrates a detail of arrangement 100 according to the present invention. A galvanic element 202 is apparent in the detail of arrangement 100. In addition, a support structure in the interior of galvanic element 202 is apparent in FIG. 5. In the specific embodiment shown in FIG. 5, the support structure is configured in the form of embossments 18 in current collectors 1, 7. In addition, a layer of an insulating material 19 is situated on embossments 18. In the event of a force effect in stacking direction 204, the acting forces may thus be at least partially transmitted from the particular current collector 1, 7, via separator 5, to respective oppositely situated current collector 1, 7 without electrodes 2, 6 being deformed. The material of current collectors 1, 7 (generally a metal foil), in particular after embossments 18 are provided, is more rigid than the material of electrodes 2, 6, and is therefore better suited for absorbing the forces.

Of course, it is possible to also use the support structures illustrated in FIG. 5 in other stacking sequences of the layers in a galvanic element 201.

Figure 6:
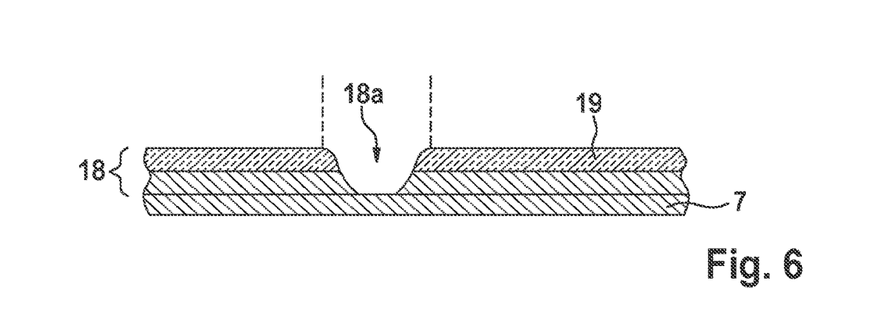
FIG. 6 shows an opening within a support structure.

FIG. 6 illustrates a current collector 7, associated with cathode 6, having an embossment 18, the sectional view illustrated in FIG. 6 being perpendicular to the illustration in FIG. 5 at position A. Embossment 18 is provided with an insulating material 19 at the side of the embossment facing the separator. Within cathode 6, embossment 18 represents a barrier which does not allow any substance exchange. In particular, a flow of any catalyst present in cathode 6 is prevented. However, this is undesirable, since it may result in imbalances in the current flow through the electrode, and thus, nonuniform charging and discharging of the galvanic element. For this reason, interruptions 18a are provided in embossment 18 which act as openings and allow a substance exchange, in particular a flow of an electrolyte.

Figure 7:
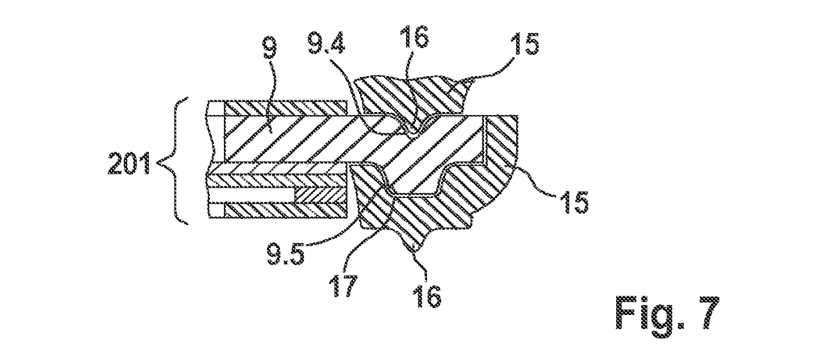
FIG. 7 shows connecting elements on a sealing element.

FIG. 7 shows one embodiment variant of a sealing element 9 which engages with a layer sequence of a galvanic element 201, 202. Sealing element 9 protrudes beyond the edge of galvanic element 201, and on one side of the protruding area has a depression 9.4, and on the opposite side of the protruding area has an elevation 9.5. Elevation 9.5 is configured in such a way that it may engage in a form-fit manner with a depression 17 in a sealing strip 15, thus establishing a stable connection between sealing element 9 and sealing strip 15. In turn, an elevation 16 which is configured for engaging with depression 9.4 in sealing element 9 is situated on sealing strip 15. Depending on the specific embodiment, it is conceivable to design sealing element 9 of each galvanic element 201, 202 as illustrated in FIG. 7, and thus to situate a sealing strip 15 in each case between two adjacent galvanic elements 201, 202. In further specific embodiments, it is conceivable for sealing strip 15 to be thicker, and, for example, to provide only every fifth galvanic element 201, 202 with a sealing element 9 which is configured as a connecting element due to depression 9.4 and elevation 9.5. The thickness of sealing strip 15 is then dimensioned in such a way that it connects two adjacent sealing elements 9, configured as a connecting element, to one another.

In one embodiment variant of the present invention, an elastomer may be used as material for sealing strip 15. In this case, sealing strip 15 is elastic and may easily compensate for changes in thickness of a galvanic element 201, 202. Examples of suitable materials for sealing strip 15 and sealing elements 9 are polypropylene (PP), polyethylene (PE), polyphenylene sulfide (PPS), and fluoroelastomers.

Elevation 16 and depression 9.4, and elevation 9.5 and depression 17, may be configured in the form of a pushbutton; i.e., for example elevation 16 is dimensioned slightly larger than depression 9.4, and correspondingly, depression 17 is dimensioned slightly smaller than elevation 9.5. When the form-fit connection is established, a force then acts which holds the connection together. Conversely, of course, it is also possible for elevation 9.5 to be slightly larger than depression 17, and for depression 9.4 to be slightly smaller than elevation 16. The geometric shapes of elevations 16 and 9.5 and of depressions 9.4 and 17 essentially correspond to one another, it being possible, as stated above, for the dimensioning to deviate somewhat. Examples of suitable geometric shapes are circles, a linear shape, a V shape, or a Z shape. In comparison to a linear shape, more complex shapes such as the V or Z shape may better absorb forces from various directions.

Figure 8A:
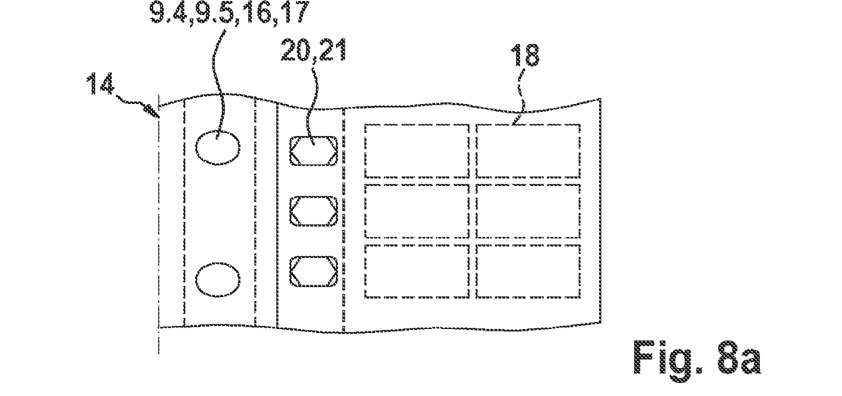
FIG. 8a shows a schematic illustration of the arrangement and positioning of the support elements in a view in the stacking direction.

FIG. 8a schematically shows a top view, in the stacking direction, onto the arrangement of connecting elements 16, 17, 9.4, 9.5, the arrangement of elevations used as support structures 18, and the arrangement of additional alignment elements 20, 21.

Depressions and elevations 16, 17, 9.4, 9.5 positioned in sealing elements 9, 10 are situated at the edge facing housing 14. Individual galvanic elements 201, 202 may be aligned relative to one another with the aid of these connecting elements.

Alignment elements 20, 21 are situated farther in the interior. The alignment elements, similarly as for embossments 18, are provided within the layer structure of a galvanic element 201, 202, and are used for aligning the individual layers of a galvanic element 201, 202 relative to one another. Embossments 18, which are used as support elements in galvanic element 201, 202 and which support electrodes 2, 6, are situated in the interior of the structure.

Support structures 18 have a rectangular design in the specific embodiment illustrated in FIG. 8a. Other shapes such as circles or hexagons would be possible in further specific embodiments.

Figure 8B:
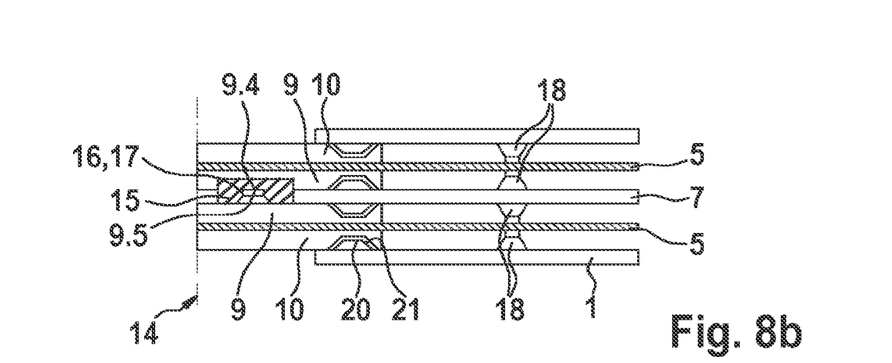
FIG. 8b shows the arrangement and positioning of the support elements in a sectional illustration.

The same situation is illustrated in FIG. 8b as in FIG. 8a, except in a sectional view from the front. FIG. 8b schematically illustrates two galvanic elements 201, 202, each galvanic element 201, 202 including a first sealing element 9 and a second sealing element 10. Sealing element 9 of first galvanic element 201 has an elevation 9.5 for connecting galvanic elements 201, 202 and aligning them with one another.

The elevation engages with a corresponding depression 17 in sealing strip 15. Sealing strip 15 in turn has an elevation 16 which engages with a corresponding depression 9.4 in first sealing element 9 of adjacently situated second galvanic element 202. The alignment of galvanic elements 201, 202 with one another is fixed by these connecting arrangements. Current collector 1 associated with the anode of first galvanic element 201 has an elevation 20 which is situated farther in the interior and which engages with a depression 21 in second sealing element 10 of first galvanic element 201. Comparable elevations and depressions are provided in the other current collectors and the sealing elements in each case situated adjacently to the current collectors. Alignment elements 20, 21 thus define the position and alignment of current collectors 1 and 7 relative to sealing elements 9, 10, and together with sealing elements 9 and 10 thus also define the exact alignment of current collectors 1, 7 with one another. In the situation illustrated in FIG. 8*b*, it is thus ensured that embossments 18 are situated exactly opposite one another in current collectors 1, 7. Alternatively, however, with the aid of this exact alignment option, a targeted lateral offset of support structure 18 in current collector 1 associated with anode 2 with respect to corresponding support structure 18 in current collector 7 associated with cathode 6 could be provided.

What is claimed is:

1. An arrangement, comprising:
    a housing; and
    multiple galvanic elements stacked in the housing, the galvanic elements having a layer sequence which includes: a current collector associated with an anode, the anode, a separator, a cathode, and a current collector associated with the cathode;
    wherein for each of the galvanic elements, a seal covers the edge of the layer sequence of one of the galvanic elements to electrically insulate and seal same in a gas-tight manner, the outer surface of the current collector associated with the anode and the outer surface of the current collector associated with the cathode remaining at least partly uncovered by the seal, so that the current collector, associated with the cathode, of a galvanic element electrically contacts the current collector, associated with the anode, of a galvanic element adjacently situated in the housing, and wherein the galvanic elements are positioned in the housing with the aid of their seal, and the housing and the seal are configured so that a galvanic element is movable relative to the housing when the galvanic element expands or contracts.

2. The arrangement of claim 1, wherein on its inner side facing a galvanic element, the seal has a space for compensating for a material expansion of one of the electrodes of a galvanic element.

3. The arrangement of claim 1, wherein at least one portion of the seal has an elastic arrangement to compensate for an expansion of a galvanic element.

4. The arrangement of claim 1, wherein the seal of the galvanic elements includes connecting elements to connect the seal of one galvanic element to the seal of another galvanic element situated in the housing.

5. The arrangement of claim 1, wherein the seal includes a sealing element having a ridge which is directed inwardly, and which is configured to at least partially transmit force, which acts on the sealing element in the stacking direction, to the separator in the direction of one of the current collectors.

6. The arrangement of claim 1, wherein the separator protrudes beyond the surfaces of the electrodes and beyond the surfaces of the current collectors, an insulating polymer layer is situated at the edges of the current collectors, and the seal includes a sealing element which is situated and configured so that the separator is pressed against one of the current collectors in a sealing manner.

7. The arrangement of claim 1, wherein the separator protrudes beyond the surfaces of the electrodes and beyond the surfaces of the current collectors, an insulating polymer layer is situated at the edges of the current collectors, and the seal for each of the galvanic elements includes two sealing elements, the thickness of one sealing element corresponding to the thickness of the anode, and the thickness of the other sealing element corresponding to the thickness of the cathode, and a sealing element being situated in the edge area, in each case between the separator and the current collector associated with the particular electrode.

8. The arrangement of claim 1, wherein the edge of the layer sequence of a galvanic element is coated with an insulating polymer or with an adhesive.

9. The arrangement of claim 1, wherein support structures are formed within the galvanic elements which are configured for absorbing forces which act on the galvanic elements in the stacking direction.

10. The arrangement of claim 1, wherein the support structures include elevations in the current collectors, an electrically insulating material being situated on the elevations.

11. The arrangement of claim 10, wherein the elevations have interruptions in the current collectors which allow an electrolyte flow.

12. A battery, comprising:
    an arrangement, including:
        a housing; and
        multiple galvanic elements stacked in the housing, the galvanic elements having a layer sequence which includes: a current collector associated with an anode, the anode, a separator, a cathode, and a current collector associated with the cathode;
        wherein for each of the galvanic elements, a seal covers the edge of the layer sequence of one of the galvanic elements to electrically insulate and seal same in a gas-tight manner, the outer surface of the current collector associated with the anode and the outer surface of the current collector associated with the cathode remaining at least partly uncovered by the seal, so that the current collector, associated with the cathode, of a galvanic element electrically contacts the current collector, associated with the anode, of a galvanic element adjacently situated in the housing, and wherein the galvanic elements are positioned in the housing with the aid of their seal, and the housing and the seal are configured so that a galvanic element is movable relative to the housing when the galvanic element expands or contracts.

\* \* \* \* \*